US011272269B1

(12) United States Patent
Chedore et al.

(10) Patent No.: US 11,272,269 B1
(45) Date of Patent: Mar. 8, 2022

(54) INTEGRATED BAND SPLITTER FOR SCALING DUAL-BAND ROADM (71) Applicant: Ciena Corporation, Hanover, MD (US)

(72) Inventors: Paul Chedore, Ottawa (CA); Jean-Luc Archambault, Ottawa (CA); David W. Boertjes, Nepean (CA); Kevan Jones, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/215,058

(22) Filed: Mar. 29, 2021

(51) Int. Cl.
H04J 14/02 (2006.01)
H04Q 11/00 (2006.01)

(52) U.S. Cl.
CPC ...... H04Q 11/0005 (2013.01); H04J 14/0213 (2013.01)

(58) Field of Classification Search
CPC .... G02B 6/293; H04J 14/021; H04J 14/0212; H04J 14/0213
See application file for complete search history.

(56) References Cited

U.S. PATENT DOCUMENTS

| | | | |
|---|---|---|---|
| 5,892,615 A | 4/1999 | Grubb et al. | |
| 5,905,745 A | 5/1999 | Grubb et al. | |
| 6,115,403 A | 9/2000 | Brenner et al. | |
| 6,275,632 B1 | 8/2001 | Waarts et al. | |
| 6,407,863 B1 | 6/2002 | Archambault et al. | |
| 6,459,516 B1 | 10/2002 | Mizrahi et al. | |
| 6,614,959 B1 | 9/2003 | Mizrahi et al. | |
| 6,618,193 B1 | 9/2003 | Boertjes | |
| 6,795,607 B1 | 9/2004 | Archambault et al. | |
| 7,231,107 B1 | 6/2007 | Zhong et al. | |
| 7,254,327 B1 | 8/2007 | Zhong et al. | |
| 7,693,357 B2 | 4/2010 | Marrakchi El Fellah et al. | |
| 7,809,272 B2 | 10/2010 | Zhong et al. | |
| 7,962,049 B2 | 6/2011 | Mateosky et al. | |
| 8,364,036 B2 | 1/2013 | Boertjes et al. | |
| 8,457,497 B2 | 6/2013 | Zhong et al. | |
| 8,509,618 B2 | 8/2013 | Boertjes et al. | |
| 8,509,621 B2 | 8/2013 | Boertjes et al. | |

(Continued)

FOREIGN PATENT DOCUMENTS

| | | |
|---|---|---|
| CA | 2189568 C | 10/2002 |
| EP | 0733223 B1 | 9/1996 |

(Continued)

OTHER PUBLICATIONS

Emmerich et al., "Capacity Limits of C+L Metro Transport Networks Exploiting Dual-Band Node Architectures", OFC 2020, OSA 2020 (Year: 2020).*

Primary Examiner — Shi K Li
(74) Attorney, Agent, or Firm — Clements Bernard Baratta; Lawrence A. Baratta, Jr.; Christopher L. Bernard (57) ABSTRACT Systems and methods for integrated band splitter for scaling a dual band Reconfigurable Optical Add/Drop Multiplexer (ROADM). A degree in a ROADM includes ROADM components including a line port and a plurality of connection ports; channel multiplexer/demultiplexer components including degree ports and local add/drop ports; and one or more band splitters in between the ROADM components and the channel multiplexer/demultiplexer components. The band splitter can be configured to split/combine C-band spectrum and L-band spectrum. The band splitter can be a passive fiber device.

20 Claims, 7 Drawing Sheets

(56) References Cited

U.S. PATENT DOCUMENTS

| | | |
|---|---|---|
| 8,554,074 B2 | 10/2013 | Boertjes et al. |
| 8,625,994 B2 | 1/2014 | Archambault et al. |
| 8,750,706 B2 | 6/2014 | Boertjes et al. |
| 8,817,245 B2 | 8/2014 | Archambault et al. |
| 8,958,696 B2 | 2/2015 | Boertjes et al. |
| 9,077,474 B2 | 7/2015 | Boertjes et al. |
| 9,419,708 B2 | 8/2016 | Rad et al. |
| 9,577,763 B2 | 2/2017 | Al Sayeed et al. |
| 9,680,569 B2 | 6/2017 | Archambault et al. |
| 9,768,902 B2 | 9/2017 | Al Sayeed et al. |
| 9,831,947 B2 | 11/2017 | Boertjes |
| 9,973,295 B2 | 5/2018 | Al Sayeed et al. |
| 10,236,981 B2 | 3/2019 | Harley et al. |
| 10,237,011 B2 | 3/2019 | Al Sayeed et al. |
| 10,237,633 B2 | 3/2019 | Chedore et al. |
| 10,250,326 B2 | 4/2019 | Bao et al. |
| 10,263,386 B1 | 4/2019 | Sridhar et al. |
| 10,277,311 B2 | 4/2019 | Archambault et al. |
| 10,277,352 B2 | 4/2019 | Chedore et al. |
| 10,374,704 B2 | 8/2019 | Archambault et al. |
| 10,404,365 B2 | 9/2019 | Frankel et al. |
| 10,411,796 B1 | 9/2019 | Archambault et al. |
| 10,454,609 B2 | 10/2019 | Chedore et al. |
| 10,455,300 B2 | 10/2019 | Swinkels et al. |
| 10,536,235 B2 | 1/2020 | Al Sayeed et al. |
| 10,615,867 B1 | 4/2020 | Bhatnagar et al. |
| 10,630,417 B1 | 4/2020 | Chedore et al. |
| 10,680,739 B2 | 6/2020 | Swinkels et al. |
| 10,746,602 B2 | 8/2020 | Pei et al. |
| 10,778,329 B1 | 9/2020 | Chedore et al. |
| 10,784,980 B2 | 9/2020 | Roberts et al. |
| 10,826,601 B2 | 11/2020 | Bhatnagar et al. |
| 10,868,614 B2 | 12/2020 | Al Sayeed et al. |
| 2003/0042402 A1 | 3/2003 | Boertjes et al. |
| 2004/0151426 A1 | 8/2004 | Boertjes et al. |
| 2007/0212064 A1 | 9/2007 | Boertjes et al. |
| 2011/0116790 A1* | 5/2011 | Sakauchi ............ H04J 14/0258 398/5 |
| 2015/0229404 A1 | 8/2015 | Boertjes |
| 2015/0229528 A1 | 8/2015 | Swinkels et al. |
| 2016/0080084 A1 | 3/2016 | Boertjes et al. |
| 2018/0234749 A1* | 8/2018 | Chedore ............ H04J 14/0212 |
| 2018/0239522 A1 | 8/2018 | Campbell et al. |
| 2020/0007262 A1 | 1/2020 | Chedore et al. |
| 2020/0374001 A1 | 11/2020 | Chedore et al. |
| 2021/0263218 A1* | 8/2021 | Robertson ............ H04B 10/50 |

FOREIGN PATENT DOCUMENTS

| | | |
|---|---|---|
| EP | 1078487 B1 | 3/2006 |
| EP | 2682730 A2 | 1/2014 |
| EP | 2564532 B1 | 10/2017 |
| WO | 1994019713 A1 | 9/1994 |
| WO | 2002082706 A2 | 10/2002 |
| WO | 2010012100 A1 | 2/2010 |
| WO | 2020112258 A1 | 6/2020 |

* cited by examiner

INTEGRATED BAND SPLITTER FOR SCALING DUAL-BAND ROADM

FIELD OF THE DISCLOSURE

The present disclosure generally relates to optical networking. More particularly, the present disclosure relates to systems and methods for integrated band splitter for scaling a dual-band Reconfigurable Optical Add/Drop Multiplexer (ROADM).

BACKGROUND OF THE DISCLOSURE

Optical networks utilize Reconfigurable Optical Add-Drop Multiplexers (ROADMs) to realize selective and reconfigurable add/drop of wavelengths or spectrum locally and between various degrees. ROADMs generally utilize Wavelength Selective Switches (WSSs) in different configurations. A ROADM is a key building block forming a terminal where there is local add/drop of optical channels and where there is routing of optical channels between multiple degrees. The optical channels are located on optical spectrum that typically includes the C-band (~1530 nm-1565 nm) and the L-band (~1565 nm-1625 nm). Initial deployments were confined to the C-band only. As capacity has increased, so have optical networks to include both C-band and the L-band. Conventional deployments of an optical networking system utilizing the C-band and the L-band utilize separate equipment components. That is, there is typically a splitter/combiner and parallel sets of equipment for the C-band and for the L-band. While this approach scales capacity on the optical fiber, it requires 2× equipment. As C+L band systems become common, there is a drive towards integrated equipment to reduce the duplication of equipment. While this reduces the amount of equipment required, there is a trade-off in terms of add/drop capacity in a ROADM. For example, integrating C+L band equipment in degree components (e.g., a Wavelength Selective Switch (WSS)) in a ROADM reduces the amount of local add/drop at the ROADM.

To support integrated C+L band equipment in a ROADM, there is a need to address the local add/drop scalability.

BRIEF SUMMARY OF THE DISCLOSURE

The present disclosure relates to systems and methods for integrated band splitter for scaling a dual-band Reconfigurable Optical Add/Drop Multiplexer (ROADM). The present disclosure addresses port scalability in integrated C+L band equipment through a band splitter in between the ROADM components and the channel multiplexer/demultiplexer components. With the use of the band splitter, any port can be either C+L band thereby recovering ports. As noted above, integrated C+L band equipment causes a reduction in the number of ports.

In an embodiment, a degree in a Reconfigurable Optical Add/Drop Multiplexer (ROADM) includes ROADM components including a line port and a plurality of connection ports; channel multiplexer/demultiplexer components including degree ports and local add/drop ports; and one or more band splitters in between the ROADM components and the channel multiplexer/demultiplexer components. The ROADM components can include integrated C-band and L-band functionality. The ROADM components can include integrated C-band and L-band functionality and the channel multiplexer/demultiplexer components are separate for the C-band and L-band functionality. The ROADM components can include a Wavelength Selective Switches (WSS) that supports integrated C-band and L-band functionality.

Each of the one or more band splitters can include three ports with a common port configured to connect to one of the plurality of connection ports, a C-band port configured to connect to a degree port of C-band channel multiplexer/demultiplexer components, and an L-band port configured to connect to a degree port of L-band channel multiplexer/demultiplexer components. The band splitter can be configured to split/combine C-band spectrum and L-band spectrum. The band splitter can be a passive fiber device. The band splitter can be integrated into a fiber shuffler located between the ROADM components and the channel multiplexer/demultiplexer components.

In another embodiment, a Reconfigurable Optical Add/Drop Multiplexer (ROADM) node includes one or more degrees configured to connect to optical fibers in an optical network, each of the one or more degrees include ROADM components including a line port and a plurality of connection ports; channel multiplexer/demultiplexer components including degree ports and local add/drop ports; and one or more band splitters in between the ROADM components and the channel multiplexer/demultiplexer components. The ROADM components can include integrated C-band and L-band functionality. The ROADM components can include integrated C-band and L-band functionality and the channel multiplexer/demultiplexer components are separate for the C-band and L-band functionality.

The ROADM components can include a Wavelength Selective Switches (WSS) that supports integrated C-band and L-band functionality. Each of the one or more band splitters can include three ports with a common port configured to connect to one of the plurality of connection ports, a C-band port configured to connect to a degree port of C-band channel multiplexer/demultiplexer components, and an L-band port configured to connect to a degree port of L-band channel multiplexer/demultiplexer components. The band splitter can be configured to split/combine C-band spectrum and L-band spectrum. The band splitter can be a passive fiber device. The band splitter can be integrated into a fiber shuffler located between the ROADM components and the channel multiplexer/demultiplexer components. Degree-to-degree connectivity can be via connections between the connection ports of the respective degrees.

In a further embodiment, a method includes providing ROADM components including a line port and a plurality of connection ports for connectivity to an optical network; providing channel multiplexer/demultiplexer components including degree ports and local add/drop ports for local add/drop; and utilizing one or more band splitters in between the ROADM components and the channel multiplexer/demultiplexer components for scaling add/drop connectivity to the ROADM components. The ROADM components can include integrated C-band and L-band functionality and the channel multiplexer/demultiplexer components are separate for the C-band and L-band functionality. Each of the one or more band splitters can include three ports with a common port configured to connect to one of the plurality of connection ports, a C-band port configured to connect to a degree port of C-band channel multiplexer/demultiplexer components, and an L-band port configured to connect to a degree port of L-band channel multiplexer/demultiplexer components.

BRIEF DESCRIPTION OF THE DRAWINGS

The present disclosure is illustrated and described herein with reference to the various drawings, in which like refer

DETAILED DESCRIPTION OF THE DISCLOSURE

The present disclosure relates to systems and methods for integrated band splitter for scaling a dual-band Reconfigurable Optical Add/Drop Multiplexer (ROADM). The present disclosure addresses port scalability in integrated C+L band equipment through a band splitter in between the ROADM components and the channel multiplexer/demultiplexer components. With the use of the band splitter, any port can be either C+L band thereby recovering ports. As noted above, integrated C+L band equipment causes a reduction in the number of ports.

Figure 1:
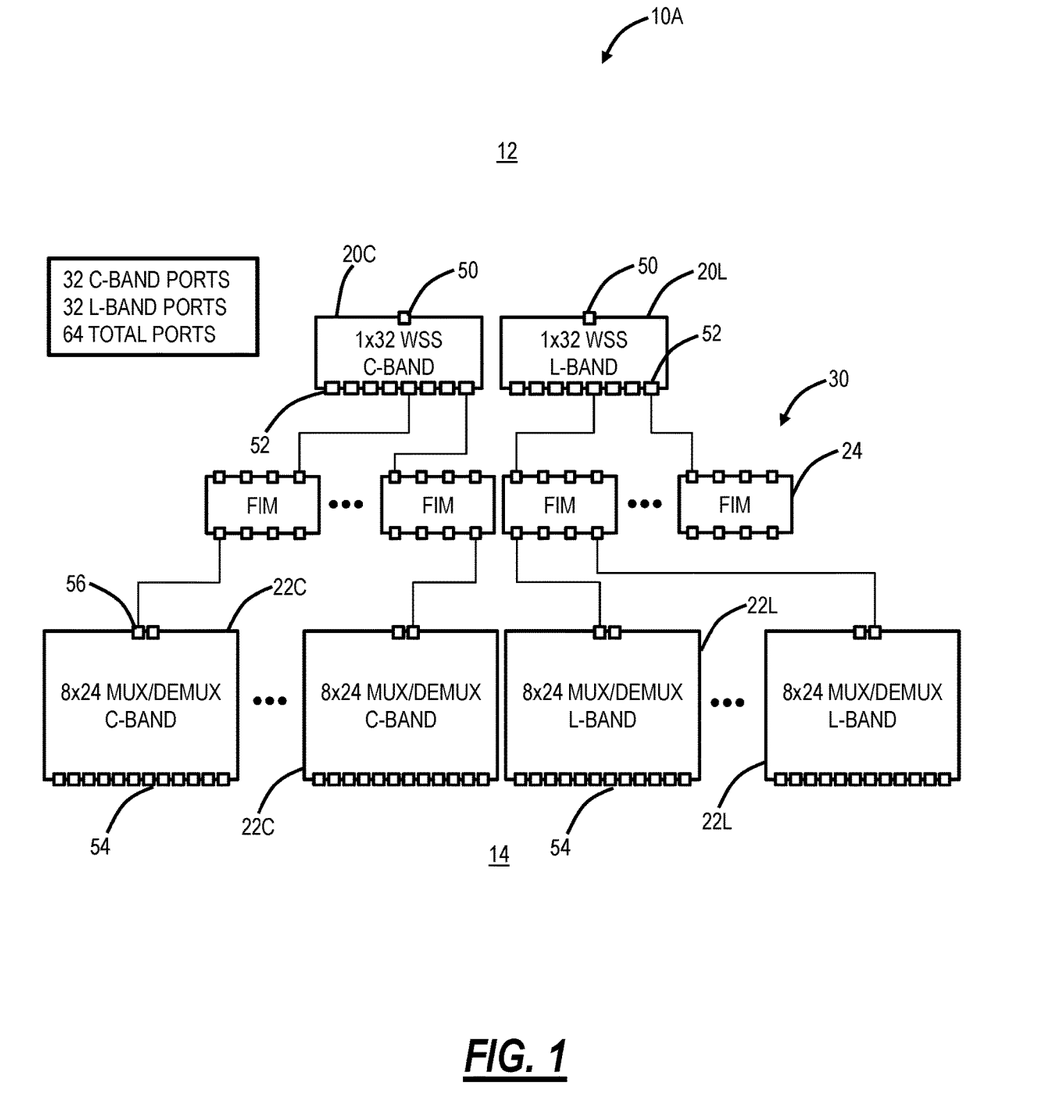
- FIG. 1 is a block diagram of a conventional C+L band ROADM degree where the C-band and L-band equipment is separate.
Figure 2:
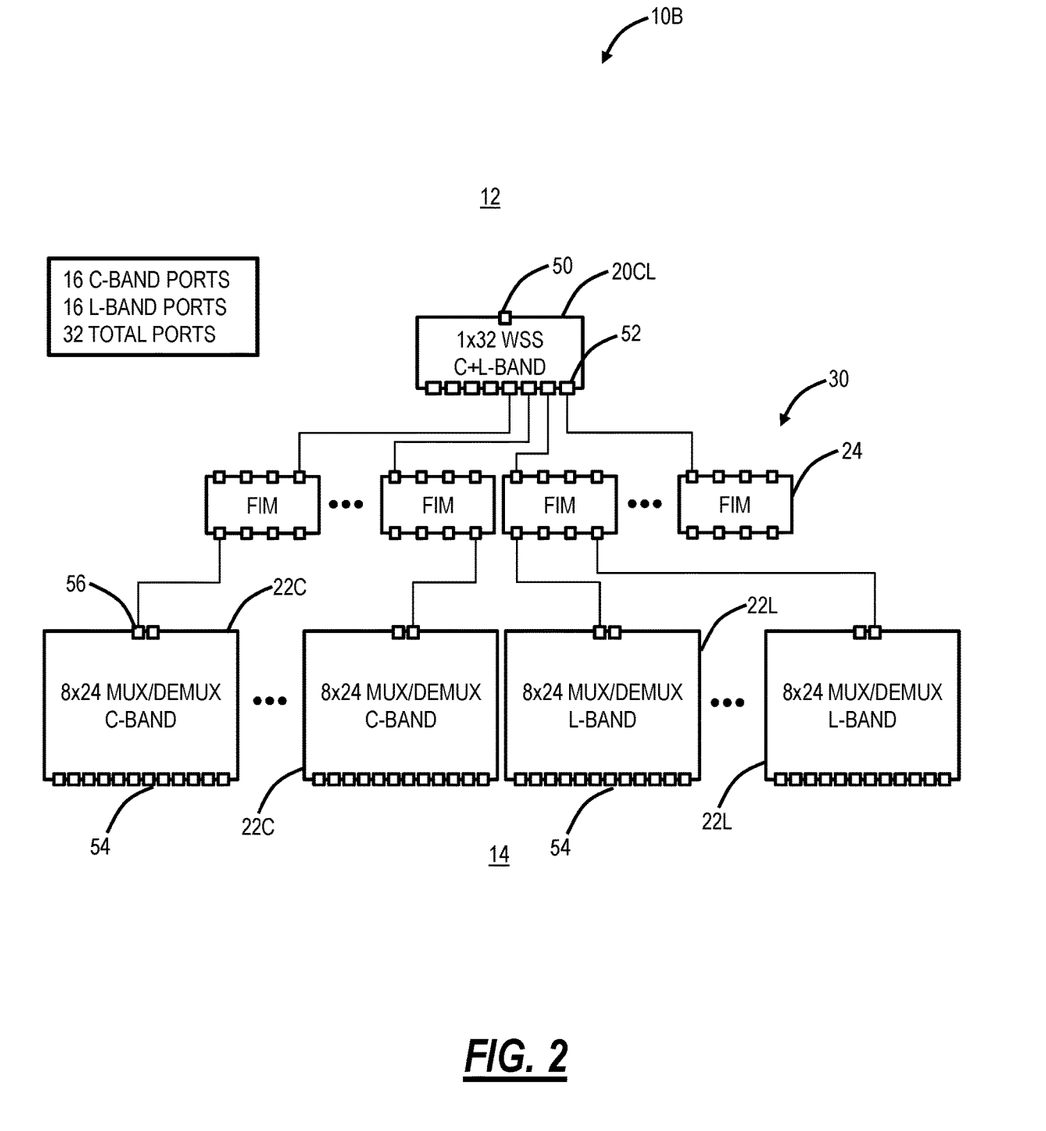
FIG. 2 is a block diagram of a C+L band ROADM degree where the C-band and L-band equipment share equipment including a WSS and have reduced local add/drop capability.
Figure 3:
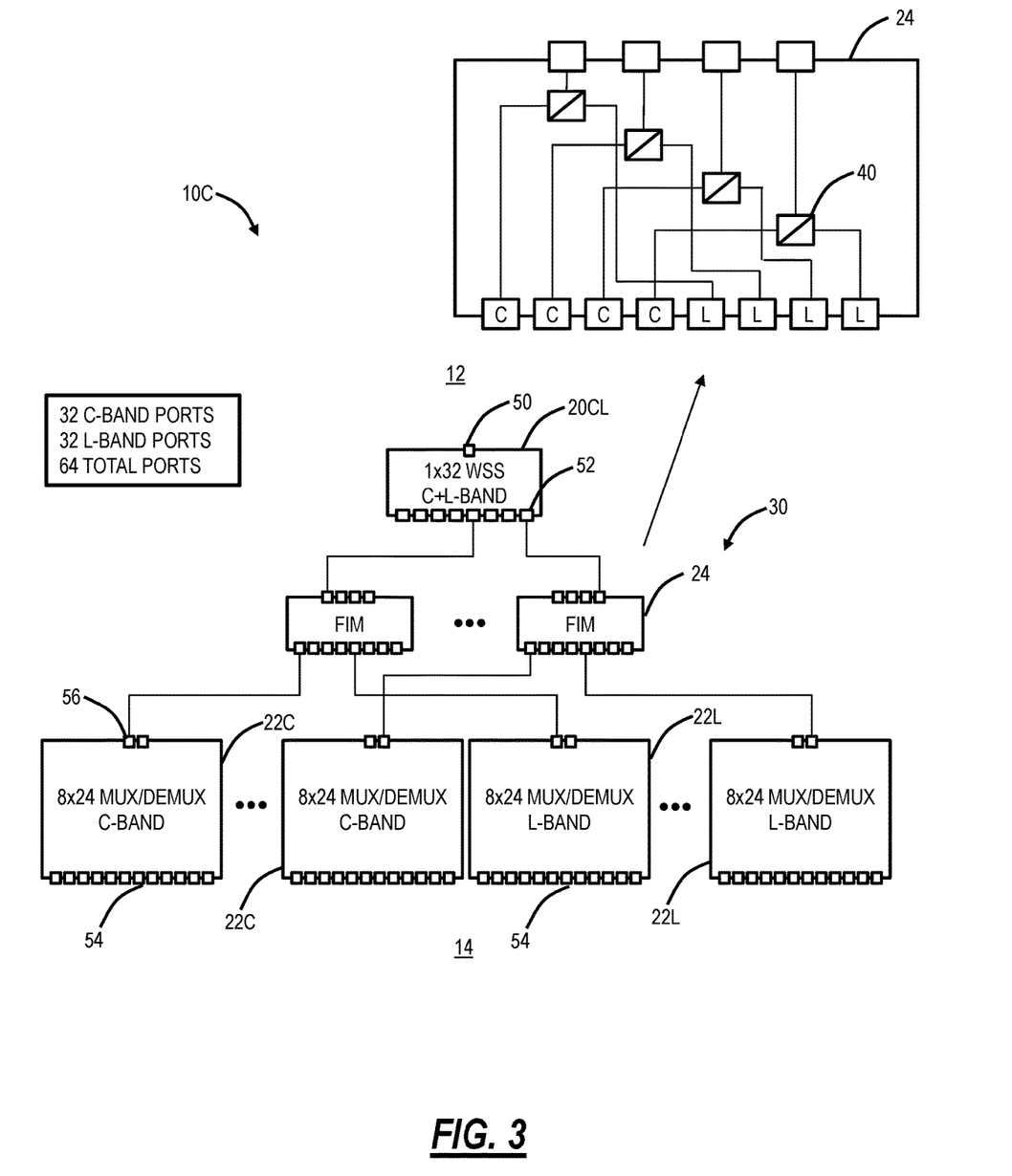
FIG. 3 is a block diagram of a C+L band ROADM degree where the C-band and L-band equipment share degree equipment and have improved local/add drop capability based on an inline band splitter.
Figure 4:
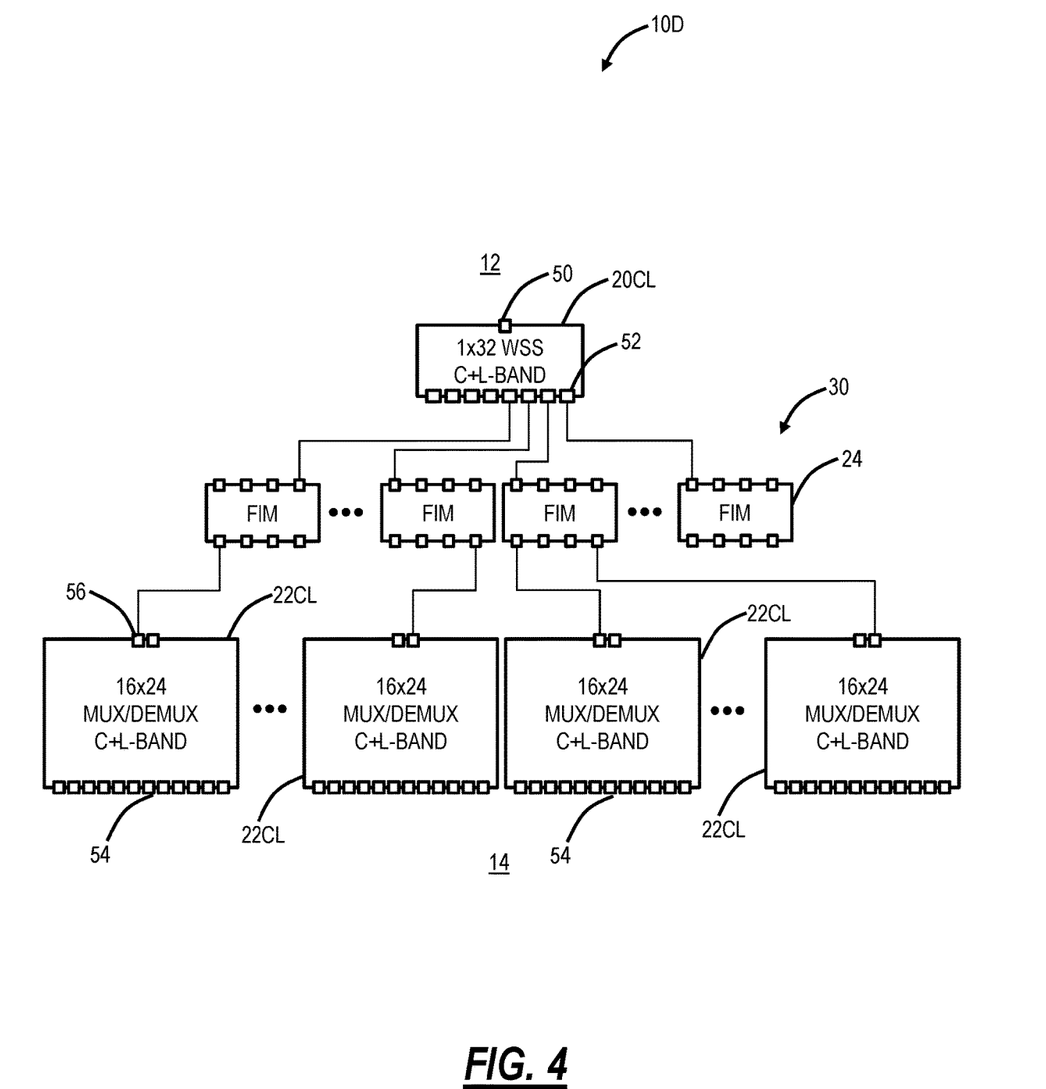
FIG. 4 is a block diagram of a C+L band ROADM degree where the C-band and L-band equipment share degree and local add/drop equipment.

FIGS. 1-4 are block diagrams of a ROADM degree 10A, 10B, 10C, 10D. Specifically, FIG. 1 is a block diagram of a conventional ROADM degree 10A where the C-band and L-band equipment is separate. FIG. 2 is a block diagram of a ROADM degree 10B where the C-band and L-band equipment share equipment and have reduced local add/drop capability. FIG. 3 is a block diagram of a ROADM degree 10C where the C-band and L-band equipment share degree equipment and have improved local/add drop capability based on an inline band splitter 12. FIG. 4 is a block diagram of a ROADM degree 10D where the C-band and L-band equipment share degree and local add/drop equipment.

As is known in the art, a ROADM degree 10 includes various components for interfacing optical fibers at a terminal. Each network element can have one to N degrees, N being an integer. For example, a one-degree node interfaces a single adjacent node. A two-degree node interfaces two adjacent nodes, e.g., a logical East and West direction, a four-degree node interfaces four adjacent nodes, e.g., a logical North, South, East, and West direction, etc. ROADM deployments are scaling, and it is possible to have multiple degree nodes, including 16 degrees are more. FIGS. 1-4 each illustrate the architecture of a single degree, and those skilled in the art will recognize it can be duplicated multiple times as needed depending on the number of degrees.

The present disclosure relates to a ROADM architecture for dual-band operation. Note, traditionally, the most used bands in the optical spectrum are the C-band (~1530 nm-1565 nm) and the L-band (~1565 nm-1625 nm). Of course, there can be other bands as are known in the art. The ROADM degrees 10 in all of the FIGS. 1-4 each supports the C-band and the L-band for illustration purposes. Also, the ROADM degrees 10 in FIGS. 1-4 include various components labeled as N×M devices, N and M are integers, such as 1×32, 8×24, 16×24, etc. First, these numbers define port counts, such as 1 common port and 32 input/output ports. Second, those skilled in the art will recognize these numbers increase over time as components evolve, and future, higher density port counts are expected and contemplated herewith.

Functionally, the ROADM degree 10 includes a line side 12 and a local add/drop side 14 with intervening components therebetween. The ROADM degree 10 in FIGS. 1-4 is illustrated from the perspective of modules 20, 22, 24. Details of the components and functionality of each of the modules 20, 22, 24 is described herein, and the present disclosure contemplates different module implementations, integrations, etc. That is, the term module is used herein as typical deployments use different modules to house components. However, those skilled in the art will recognize the present disclosure contemplates any equivalent functions regardless of how integrated into modules. The modules include ROADM modules 20, channel multiplexer/demultiplexer modules 22, and fiber interconnect modules (FIM) 24.

Figure 5:
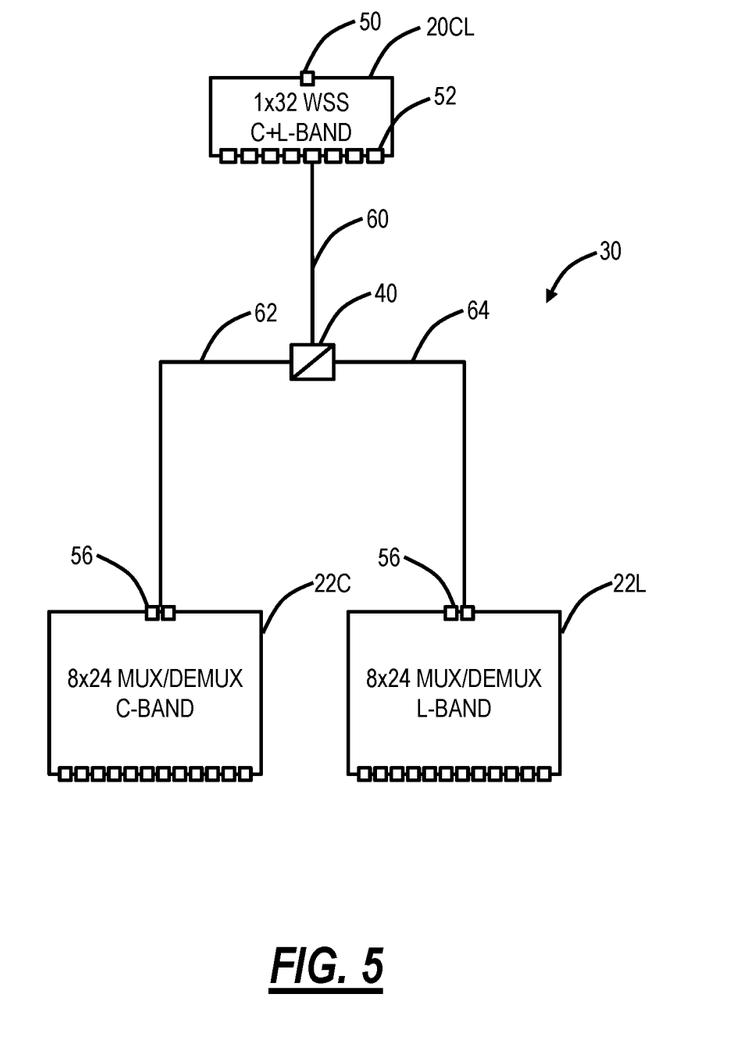
FIG. 5 is a block diagram illustrating a band splitter in between the ROADM module and the channel multiplexer/demultiplexer modules.
Figure 6:
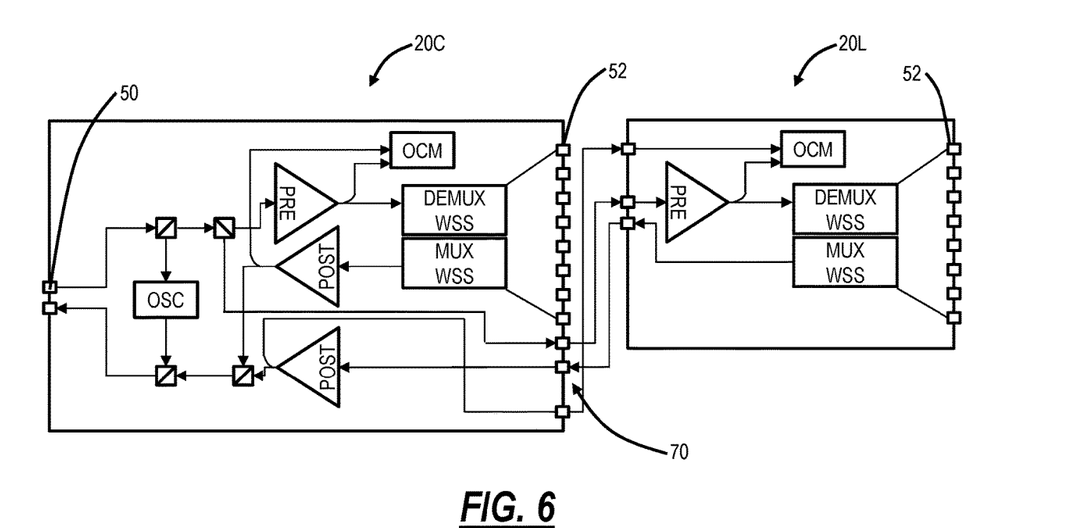
FIG. 6 is a block diagram of example components in separate C-band and L-band ROADM modules.

The ROADM modules 20 interfaces the line side 12 and can include, e.g., twin 1×32 flexible grid WSSs (one for transmit and one for receive), pre- and post-amplifiers such as Erbium-Doped Fiber Amplifiers (EDFAs), bi-directional Optical Time Domain Reflectometer (OTDR), Optical Channel Monitors (OCMs), Optical Service Channels (OSC), integrated Amplified Spontaneous Emission (ASE) sources for channel loading, and the like. The ROADM module 20 is referenced as a ROADM module 20C, 20L, 20CL where the suffix C, L, and CL denote the components support the C-band, the L-band, and both the C-band and the L-band in an integrated manner, respectively. FIGS. 5 and 6 illustrate internal components in example ROADM modules 20C, 20L, 20CL. The ROADM modules 20 are referred to as ROADM module as they provide the components to connect to external optical fibers for a degree and to fan out/in connections to other ROADM modules of other degrees for express connections and to the channel multiplexer/demultiplexer modules 22 for local add/drop.

The channel multiplexer/demultiplexer modules 22 interfaces the local add/drop side 14 connecting to local optical modems, transceivers, transponders, etc. The channel multiplexer/demultiplexer modules 22 also can include contentionless WSSs for interconnecting local add/drop channels to any degree (i.e., ROADM modules 20) for CDC-ROADM applications. Flexibility in add/drop requirements has led to so-called colorless, directionless, and optionally contentionless add/drop multiplexer structures, such as in ROADM devices, nodes, architectures, and structures. A colorless add/drop device supports any wavelength or spectral occupancy/band being added to any port of an add/drop device, i.e., ports are not wavelength specific. A directionless add/drop device supports any port being directed to any degree. Finally, a contentionless add/drop device supports multiple instances of the same channel (wavelength) in the same device (albeit to different degrees). A colorless, directionless add/drop device can be referred to as a CD device, and a colorless, directionless, and contentionless add/drop device can be referred to as a CDC device. Also, the channel multiplexer/demultiplexer modules 22 are referenced as modules 22C, 22L, 22CL, where the suffix C, L, and CL denote the components support the C-band, the L-band, and both the C-band and the L-band in an integrated manner, respectively. Also, the channel multiplexer/demultiplexer modules 22 are illustrated as a single layer, and those skilled in the art will recognize various different multiplexer/demultiplexer structures are possible, including layered approaches.

Finally, the fiber interconnect modules 24 are passive modules that support fiber connectivity between the ROADM modules 20 and the channel multiplexer/demultiplexer modules 22. That is, the fiber interconnect modules 24 is a fiber shuffler and can be used with high-density fiber cables such as Multi-fiber Push On (MPO) cables. The function here is to reduce cabling and provide a single point of interface similar to Fiber Distribution Panels (FDP). Of note, the fiber interconnect modules 24 can be referred to a fiber interconnect 30 between the ROADM modules 20 and the channel multiplexer/demultiplexer modules 22. Specifically, the present disclosure relates to a band splitter 40 in the fiber interconnect 30 or the fiber interconnect modules 24, and the present disclosure does not necessarily need the band splitter 40 in a module (the fiber interconnect modules 24) nor does the fiber interconnect 30 have to be in a module (the fiber interconnect modules 24).

The following describes connectivity between the modules 20, 22, 24. The illustrations in FIGS. 1-4 include single lines and a subset of the number of ports, for convenience of illustration. Those skilled in the art will recognize actually connectivity can include two lines (transmit and receive) for each connection and there are more ports than are shown, i.e., for a 1×32 ROADM module 20, for an 8×24 channel multiplexer/demultiplexer module 22, etc. That is, the term port used herein may refer to two connections (transmit and receive).

The ROADM modules 20 include a line port 50 that connects to external optical fibers, i.e. the line side 12, and a plurality of connection ports 52. The channel multiplexer/demultiplexer modules 22 include local add/drop ports 54 and degree ports 56. Note, the various ports are given different names to help distinguish. The local add/drop ports 54 ultimately connect to the local optical modems, transceivers, transponders, etc. There may also be inline pre-combiner devices as well, such as described in commonly-assigned U.S. patent application Ser. No. 16/567,023, filed Sep. 11, 2019, and entitled "Upgradeable colorless, directionless, and contentionless optical architectures," the contents of which are incorporated by reference in their entirety. The degree ports 56 on the channel multiplexer/demultiplexer modules 22 connect to the connection ports 52 on the ROADM modules 20. Again, the fiber interconnection modules 24 are used to streamline the connections between the degree ports 56 and the connection ports 52, as a fiber shuffler supporting high-density cabling. Generally, the interconnectivity between the degree ports 56 and the connection ports 52 can be referred to as the fiber connectivity 20.

FIG. 1 illustrates the conventional ROADM degree 10A where the C-band and the L-band components are separate (namely parallel sets of components for each, even though they can be integrated in the same modules). Here, the conventional ROADM degree 10A includes two ROADM modules 20C, 20L, various channel multiplexer/demultiplexer modules 22C, 22L as needed for local add/drop, and the fiber interconnect 30, such as via the fiber interconnection modules 24. Note, because the ROADM degree 10A includes two ROADM modules 20C, 20L, there are a total of 64 of the connection ports 52.

Assuming a full-fill of each of the C-band and the L-band is 32 channels total per band or 64 channels total. If a node utilizing the ROADM degree 10A had eight degrees (8D) or twelve degrees (12D), the node would support 100% local add/drop. Now, for sixteen degrees (16D), the node would only support 75% local add/drop. That is, the more degrees, the more connection ports 52 are needed for degree-to-degree connectivity, thereby limiting the connectivity to the channel multiplexer/demultiplexer modules 22 for local add/drop. Stated differently, the connection ports 52 are used for either local add/drop or for degree-to-degree connectivity. Having separate C&L band ROADM modules 20C, 20L results in more available connection ports 52.

Figure 7:
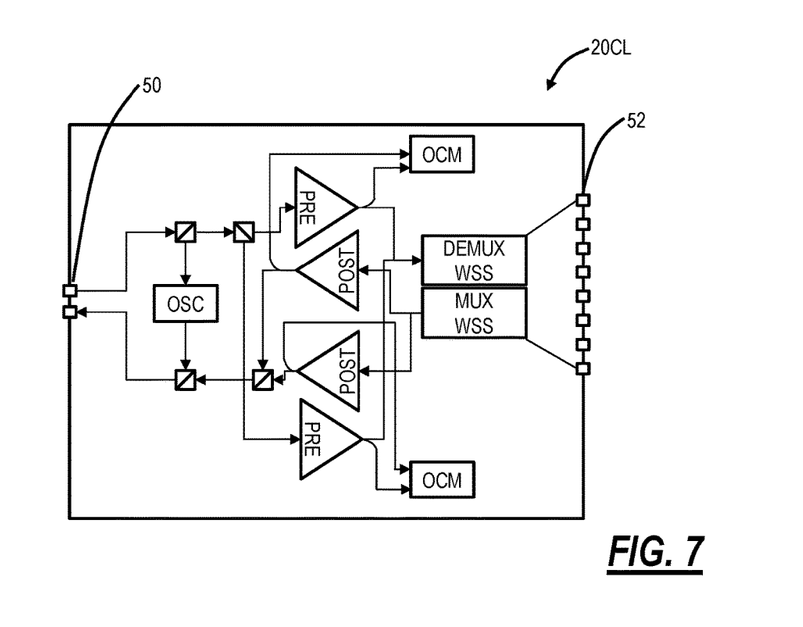
FIG. 7 is a block diagram of example components in an integrated C-band and L-band ROADM module, including an integrated C+L band WSS.

C&L band ROADM architectures are proving very popular as the need for bandwidth continues to grow. There is a desire for cost and component reduction to improve integration. The ROADM degree 10B in FIG. 2 illustrates the integration of the ROADM module 20CL. The ROADM module 20CL includes optical components that can support both the C-band and the L-band. The ROADM module 20CL is illustrated in FIG. 7. Of note, the ROADM modules 20 represent a sizeable portion of the ROADM cost structures; therefore, combining these functions in a single module can provide a meaningful cost reduction over the existing design. As is seen in FIGS. 6-7, the ROADM module 20CL only requires two WSSs versus four WSSs with the ROADM modules 20C, 20L.

While significantly reducing cost and components, the ROADM module 20CL effectively has half the number of connection ports 52 as with both the ROADM modules 20C, 20L, e.g., 32 connection ports 52 for the ROADM module 20CL versus 64 connection ports 52 for the ROADM modules 20C, 20L. The ROADM module 20CL shares the connection ports 52 across both bands. A given connection port 52 port would be C-band or L-band based on the channel multiplexer/demultiplexer modules 22C, 22L used.

Stated differently, in the parallel design of the ROADM degree 10A, there are 32 C-band ports 52 in the ROADM module 20C and 32 L-band ports 52 in the ROADM modules 20L which results in a total of 64 WSS ports. With the ROADM module 20CL approach, there are now 32 ports 52 in total across both bands. This results in a lower number of channel multiplexer/demultiplexer modules 22C, 22L attachment points causing a lower add/drop capacity.

Assuming the full-fill of each of the C-band and the L-band is 32 channels total per band or 64 channels total, as above. If a node utilizing the ROADM degree 10B had eight degrees (8D), the node would support 100% local add/drop. But, for twelve degrees (12D), the node would support 94% local add/drop, and, for sixteen degrees (16D), the node would only support 38% local add/drop. Thus, the cost reduction of the integrated ROADM module 20CL comes at the expense of reduced local add/drop capability.

The present disclosure addresses and recovers the local add/drop capability lost by reducing the port count in the ROADM module 20CL. Because the ROADM degree 10A has 2× the number of connection ports 52 as the ROADM degree 10B, it can connect to 2× the number of channel multiplexer/demultiplexer modules 22C, 22L, whereas the ROADM degree 10B can only connect to X the number of channel multiplexer/demultiplexer modules 22C, 22L.

To address add/drop scaling, the present disclosure contemplates use of a band splitter 40 in between the ROADM module 20CL and the channel multiplexer/demultiplexer modules 22C, 22L. FIG. 3 illustrates the band splitter 40 integrated in the fiber interconnect modules 24. FIG. 5 is a block diagram illustrating a band splitter 40 in between the ROADM module 20CL and the channel multiplexer/demultiplexer modules 22C, 22L, i.e., anywhere in the fiber interconnect 30. Effectively, the band splitter 40 enables the reduced connection port 52 ROADM module 20CL to connect to the same number of channel multiplexer/demultiplexer modules 22C, 22L as the higher connection port 52 ROADM modules 20C, 20L.

The band splitter 40 is a passive device that optically performs a 2:1 splitting and 1:2 combining of the C-band and the L-band. The band splitter 40 includes 3 ports 60, 62, 64 including a common port 60, a C-band port 62, and an L-band port 64. The common port 60 connects to one of the connection ports 52 on the ROADM module 20CL, the C-band port 62 connects to the channel multiplexer/demultiplexer module 22C, and the L-band port 64 connects to the channel multiplexer/demultiplexer module 22L.

With the band splitter 40, assuming a full-fill of each of the C-band and the L-band is 32 channels total per band or 64 channels total. If a node utilizing the ROADM degree 100 had 32-channels with eight degrees (8D) or twelve degrees (12D), the node would support 100% local add/drop. Now, for sixteen degrees (16D), the node would only support 75% local add/drop. That is, the ROADM degree 10C has the same add/drop capability as the ROADM degree 10A while having half the connection ports 52.

The first step in integration is the ROADM module 20CL, but FIG. 4 illustrates a fully-integrated solution for the ROADM degree 10D where both the ROADM module 20CL and the channel multiplexer/demultiplexer modules 22CL support both the C-band and the L-band. Here, there is also a reduction in the add/drop capability similar to the ROADM degree 10B.

In an embodiment, a degree 10A includes ROADM components 20CL including a line port 50 and a plurality of connection ports 52; channel multiplexer/demultiplexer components 22C, 22L including degree ports 56 and local add/drop ports 54; and one or more band splitters 40 in between the ROADM components 20CL and the channel multiplexer/demultiplexer components 22C, 22L.

The ROADM components 20CL can include integrated C-band and L-band functionality. The ROADM components 20CL can include integrated C-band and L-band functionality, and the channel multiplexer/demultiplexer components 22C, 22L are separate for the C-band and L-band functionality. The ROADM components 20CL can include two Wavelength Selective Switches (WSSs) that support integrated C-band and L-band functionality.

Each of the one or more band splitters 40 include three ports 60, 62, 64 with a common port 60 configured to connect to one of the plurality of connection ports 52, a C-band port 62 configured to connect to a degree port 56 of C-band channel multiplexer/demultiplexer components 20C, and an L-band port 64 configured to connect to a degree port 56 of L-band channel multiplexer/demultiplexer components 22L.

The band splitter 40 can be configured to split/combine C-band spectrum and L-band spectrum. The band splitter 40 can be a passive fiber device. The band splitter 40 can be integrated into a fiber shuffler 24 located between the ROADM components 20CL and the channel multiplexer/demultiplexer components 22C, 22L.

In another embodiment, a ROADM node includes one or more degrees 10C configured to connect to optical fibers in an optical network. Degree-to-degree connectivity is via connections between the connection ports 52 of the respective degrees 10C.

FIG. 6 is a block diagram of example components in the ROADM modules 20C, 20L. FIG. 7 is a block diagram of example components in the ROADM module 20CL. In FIG. 6, the ROADM modules 20C, 20L are illustrated in an upgradeable manner where the ROADM module 20C can be initially deployed and the ROADM module 20L can be added later as an upgrade. Here, the ROADM module 20L connects to upgrade ports 70 on the ROADM module 20C. Thus, the ROADM module 20L does not have its own port 50, but connects through the upgrade ports 70. Each of the ROADM modules 20C, 20L include two WSSs, one multiplexer (MUX) WSS and one demultiplexer (DEMUX) WSS, as well as pre-amplifiers and post amplifiers, OSC, and OCM.

The ROADM module 20CL includes only two WSSs that support spectrum across both the C-band and the L-band. As mentioned before, the WSSs are significant cost and the ROADM module 20CL reduces the number of WSSs by half.

Figure 8:
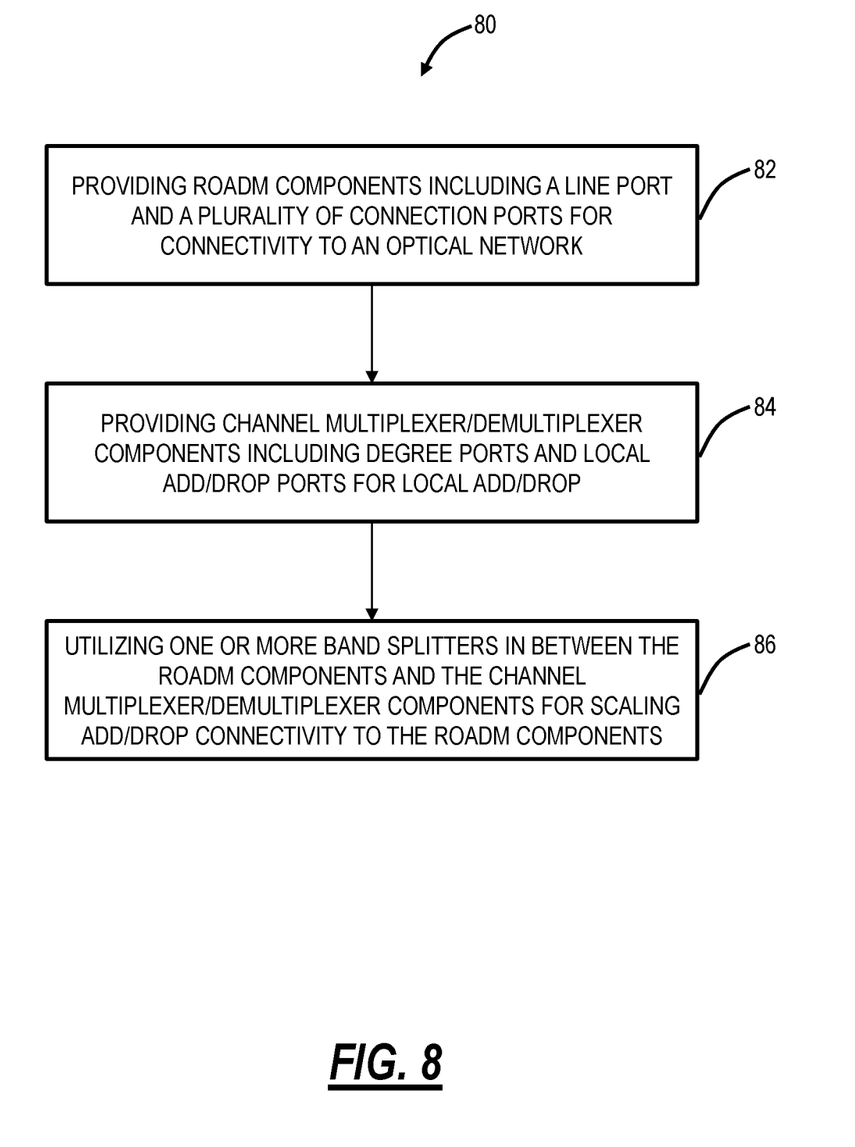
FIG. 8 is a flowchart of a process for an integrated band splitter for scaling a dual-band ROADM.

FIG. 8 is a flowchart of a process 80 for an integrated band splitter for scaling a dual band ROADM. The process 80 includes providing ROADM components including a line port and a plurality of connection ports for connectivity to an optical network (step 82); providing channel multiplexer/demultiplexer components including degree ports and local add/drop ports for local add/drop (step 84); and utilizing one or more band splitters in between the ROADM components and the channel multiplexer/demultiplexer components for scaling add/drop connectivity to the ROADM components (step 86).

The ROADM components can include integrated C-band and L-band functionality and the channel multiplexer/demultiplexer components are separate for the C-band and L-band functionality. Each of the one or more band splitters include three ports with a common port configured to connect to one of the plurality of connection ports, a C-band port configured to connect to a degree port of C-band channel multiplexer/demultiplexer components, and an L-band port configured to connect to a degree port of L-band channel multiplexer/demultiplexer components.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A degree in a Reconfigurable Optical Add/Drop Multiplexer (ROADM) comprising:
    ROADM components including a line port and a plurality of connection ports;
    channel multiplexer/demultiplexer components including degree ports and local add/drop ports; and
    one or more band splitters in between the ROADM components and the channel multiplexer/demultiplexer components.

2. The degree of claim 1, wherein the ROADM components include integrated C-band and L-band functionality.

3. The degree of claim 1, wherein the ROADM components include integrated C-band and L-band functionality and the channel multiplexer/demultiplexer components are separate for the C-band and L-band functionality.

4. The degree of claim 1, wherein the ROADM components include a Wavelength Selective Switches (WSS) that supports integrated C-band and L-band functionality.

5. The degree of claim 1, wherein each of the one or more band splitters include three ports with a common port configured to connect to one of the plurality of connection ports, a C-band port configured to connect to a degree port of C-band channel multiplexer/demultiplexer components, and an L-band port configured to connect to a degree port of L-band channel multiplexer/demultiplexer components.

6. The degree of claim 1, wherein at least one of the one or more band splitters is configured to split/combine C-band spectrum and L-band spectrum.

7. The degree of claim 1, wherein at least one of the one or more band splitters is a passive fiber device.

8. The degree of claim 1, wherein at least one of the one or more band splitters is integrated into a fiber shuffler located between the ROADM components and the channel multiplexer/demultiplexer components.

9. A Reconfigurable Optical Add/Drop Multiplexer (ROADM) node comprising:
    one or more degrees configured to connect to optical fibers in an optical network, each of the one or more degrees include
        ROADM components including a line port and a plurality of connection ports;
        channel multiplexer/demultiplexer components including degree ports and local add/drop ports; and
        one or more band splitters in between the ROADM components and the channel multiplexer/demultiplexer components.

10. The ROADM node of claim 9, wherein the ROADM components include integrated C-band and L-band functionality.

11. The ROADM node of claim 9, wherein the ROADM components include integrated C-band and L-band functionality and the channel multiplexer/demultiplexer components are separate for the C-band and L-band functionality.

12. The ROADM node of claim 9, wherein the ROADM components include a Wavelength Selective Switches (WSS) that supports integrated C-band and L-band functionality.

13. The ROADM node of claim 9, wherein each of the one or more band splitters include three ports with a common port configured to connect to one of the plurality of connection ports, a C-band port configured to connect to a degree port of C-band channel multiplexer/demultiplexer components, and an L-band port configured to connect to a degree port of L-band channel multiplexer/demultiplexer components.

14. The ROADM node of claim 9, wherein at least one of the one or more band splitters is configured to split/combine C-band spectrum and L-band spectrum.

15. The ROADM node of claim 9, wherein at least one of the one or more band splitters is a passive fiber device.

16. The ROADM node of claim 9, wherein at least one of the one or more band splitters is integrated into a fiber shuffler located between the ROADM components and the channel multiplexer/demultiplexer components.

17. The ROADM node of claim 9, wherein degree-to-degree connectivity is via connections between the connection ports of the respective degrees.

18. A method comprising:
    providing ROADM components including a line port and a plurality of connection ports for connectivity to an optical network;
    providing channel multiplexer/demultiplexer components including degree ports and local add/drop ports for local add/drop; and
    utilizing one or more band splitters in between the ROADM components and the channel multiplexer/demultiplexer components for scaling add/drop connectivity to the ROADM components.

19. The method of claim 18, wherein the ROADM components include integrated C-band and L-band functionality and the channel multiplexer/demultiplexer components are separate for the C-band and L-band functionality.

20. The method of claim 18, wherein each of the one or more band splitters include three ports with a common port configured to connect to one of the plurality of connection ports, a C-band port configured to connect to a degree port of C-band channel multiplexer/demultiplexer components, and an L-band port configured to connect to a degree port of L-band channel multiplexer/demultiplexer components.

* * * * *